UNITED STATES PATENT OFFICE.

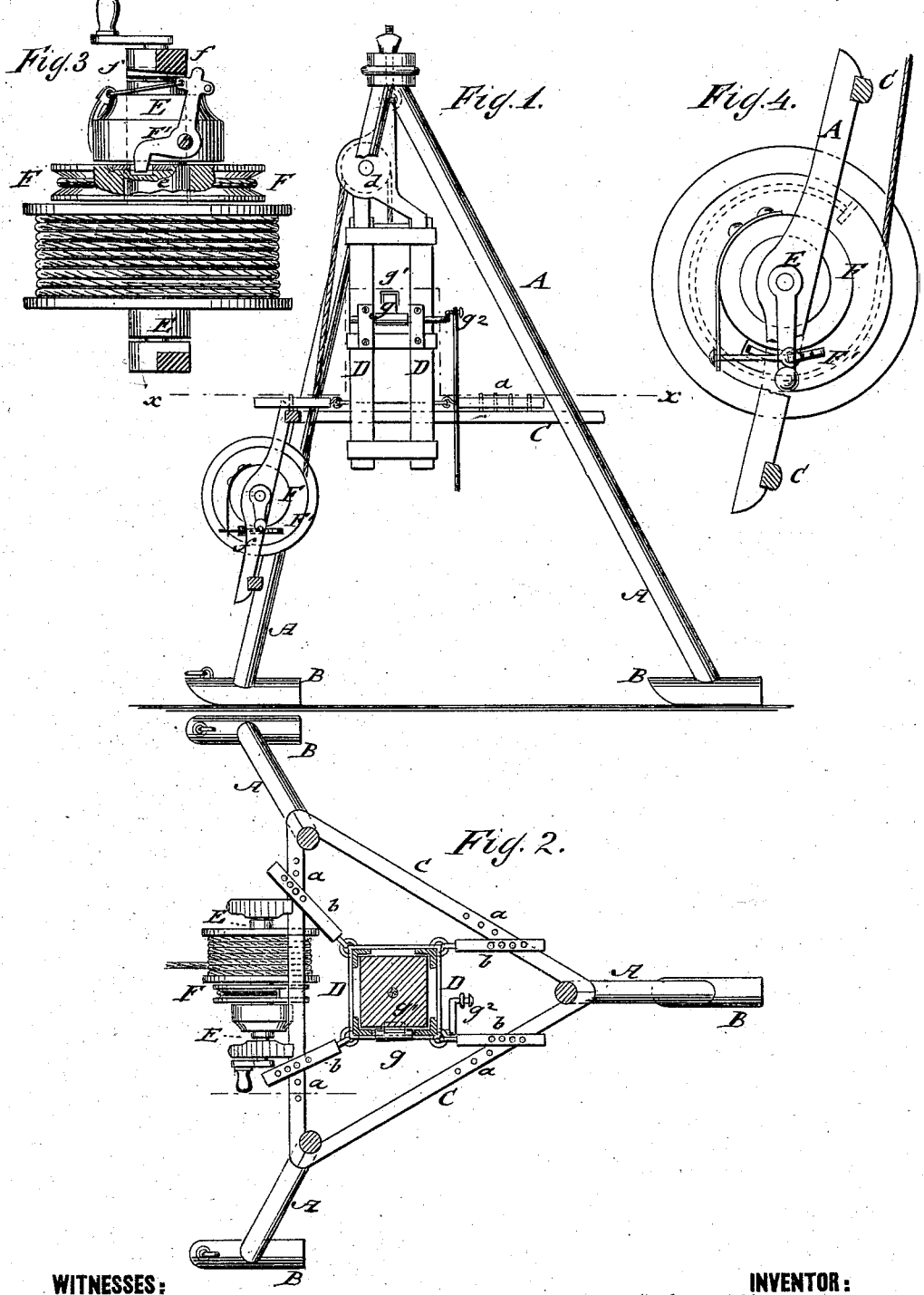

WILLIAM KINDERMANN, OF TROUTVILLE, PENNSYLVANIA.

IMPROVEMENT IN POST-DRIVERS.

Specification forming part of Letters Patent No. 192,173, dated June 19, 1877; application filed April 23, 1877.

*To all whom it may concern:*

Be it known that I, WILLIAM KINDERMANN, of Troutville, in the county of Clearfield and State of Pennsylvania, have invented a new and Improved Post-Driver, of which the following is a specification:

In the accompanying drawing, Figure 1 is a side elevation of my improved post-driver; Fig. 2, a horizontal section on line $x\,x$, Fig. 1; and Figs. 3 and 4 are detail sectional top view and a side view of the revolving pulley and releasing mechanism.

Similar letters of reference indicate corresponding parts.

The object of this invention is to provide, for the purpose of driving fence-posts, &c., an improved powerful yet simple driving-machine, that may be readily adapted to any inclination of the ground, and used with horse-power to drive the posts in rapid and effective manner.

The invention will first be described in connection with the drawing, and then pointed out in the claims.

In the drawing, A represents a supporting-frame in the shape of a tripod, or of other construction, which is dragged, by runners B, from place to place, and suitably secured to the ground for driving the post. The supporting-posts A are braced by horizontal rods C, having a number of pins, $a$, to which the retaining rods or arms $b$ of the ram-guiding frame D are attached. The ram-guiding frame D is hung by an eye or ring to the main frame, so as to swing by its own weight into vertical position above the post to be driven, whatever be the inclination of the ground. The guide-frame is then retained in position by means of the perforated rods $b$, which are placed into the proper piers of braces C, and the machine is ready for work.

The post may be guided, if desired, by a suitable block, so as to be driven vertically into the ground.

To one side of frame A is secured, in suitable bearings, the operating-shaft E, that may be revolved in its bearings, either by means of a drum and rope and horse-power, or by a hand-crank at the end of the same. The ram is raised by a cord attached to the block and running over a top pulley, $d$, of the guide-frame to a pulley, F, placed loosely on the shaft E, and locked, by a fulcrumed and spring-acted clutch, F', to the shaft, the hook-shaped end of the clutch F' entering a socket-recess, $e$, of the pulley. The hoisting-cord is attached securely to one point of the circumference of the pulley, and wound up thereon by turning the shaft. The clutch device is so arranged that when the ram is raised to its highest point in its guide-frame, the outer rounded-off end of the clutch forms contact with a plate and guide-shoulder, $f$, of the frame, (shown in Fig. 3,) releasing thereby the clutch and dropping the ram. As soon as the end of the clutch has passed the plate $f$, the spring of the clutch forces the same back into the socket of the pulley F, so as to relock the same and raise the block for the next blow.

The post is thus driven by a number of successive blows of the ram that follow each other with great rapidity, as the rope is unwound by the horse from the drum, the rope being wound up again by the hand-crank, as required.

The automatic locking and releasing of the pulley raises and drops the ram, and forms a simple yet effective apparatus for driving fence-posts, piles, &c.

When the fence-post is driven the block is retained in raised position in the guide-frame by a swinging catch, $g$, entering a side recess, $g^1$, of the block. The catch is operated by a lever-rod, $g^2$, attached to the crank end of the swinging shaft, so as to be readily carried inwardly or outwardly, as required, locking thereby the ram in position for moving the post-driving machine.

Having thus described my invention, I claim as new and desire to secure by Letters Patent—

1. The combination, with frame A, whose cross-rods are provided with pins $a$, of the guide-frame D, having perforated arms $b$, as and for the purpose described.

2. The combination, with a cord from a ram, a guide-frame having pulley $d$, a shaft having socket-pulley F, and a spring-clutch, F', of a plate and shoulder, $f$, arranged as and for the purpose specified.

WILLIAM KINDERMANN.

Witnesses:
 JOSEPH STRAUSS,
 J. REICHARD.